March 22, 1927.  1,621,676
A. F. MASURY
CUSHION CONNECTION FOR VEHICLE CONSTRUCTION
Filed Dec. 29, 1925

INVENTOR
Alfred F. Masury
BY
Redding, Greeley, O'Shea & Campbell
his ATTORNEYS

Patented Mar. 22, 1927.

1,621,676

UNITED STATES PATENT OFFICE.

ALFRED F. MASURY, OF NEW YORK, N. Y., ASSIGNOR TO INTERNATIONAL MOTOR COMPANY, OF NEW YORK, N. Y., A CORPORATION OF DELAWARE.

CUSHION CONNECTION FOR VEHICLE CONSTRUCTION.

Application filed December 29, 1925. Serial No. 78,111.

This invention relates to cushion connections for vehicle construction involving the broad principle illustrated in the patent to Alfred F. Masury and August H. Leipert No. 1,404,876 dated January 31, 1922. In accordance with the patented construction the yielding non-metallic material is retained, preferably under compression, within a housing carried with one of two parts to be connected and engages the other part. The object of the present invention is to provide a structure wherein the pressures and clearances of a block of yielding non-metallic material in a cushion connection may be varied in a plurality of directions from considerations of manufacture, assembly and use. For instance, in some situations it may be found desirable to definitely position the block within the housing without regard to the inner marginal surface of the housing. Further, it may be found desirable to vary the pressure exerted upon the block in accordance with the load to which the parts are subjected. To this end it is proposed to provide adjustable devices bearing upon the blocks or upon individual or separate seats within which the respective load, thrust and rebound sections are disposed whereby the position taken by the block in the housing and the degree of compression exerted upon the material is determined. Preferably the adjustable devices take the form of screws threaded into the walls of a housing containing the non-metallic material and bearing upon portions thereof. In order that the invention may be clearly understood and readily carried into effect the same will now be described in greater particularity in connection with the accompanying drawings illustrating a preferred embodiment thereof, in which:

Figure 1:
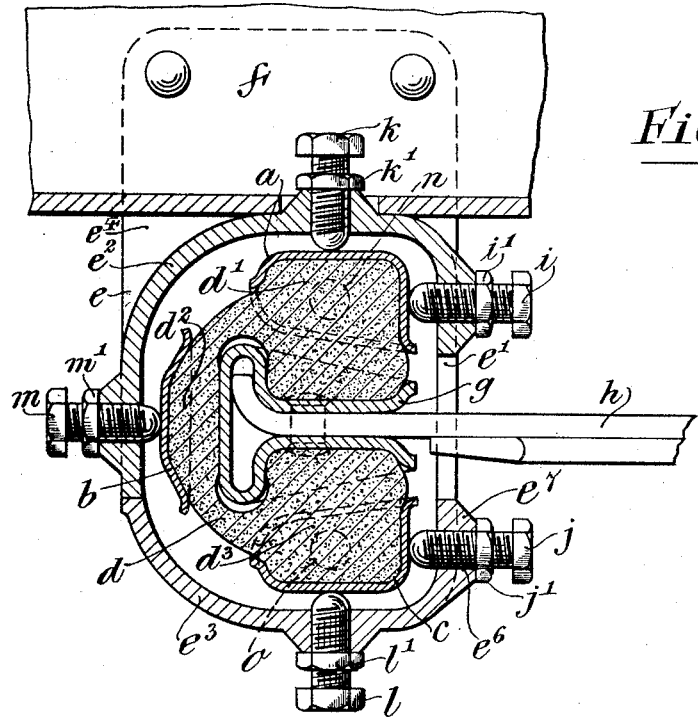
Figure 1 is a view in vertical longitudinal section showing the cushion connection according to the present invention and preferred means, such as screws, threaded into the walls of the housing and bearing upon the yielding non-metallic material whereby the pressure and position thereof may be adjusted.
Figure 2:
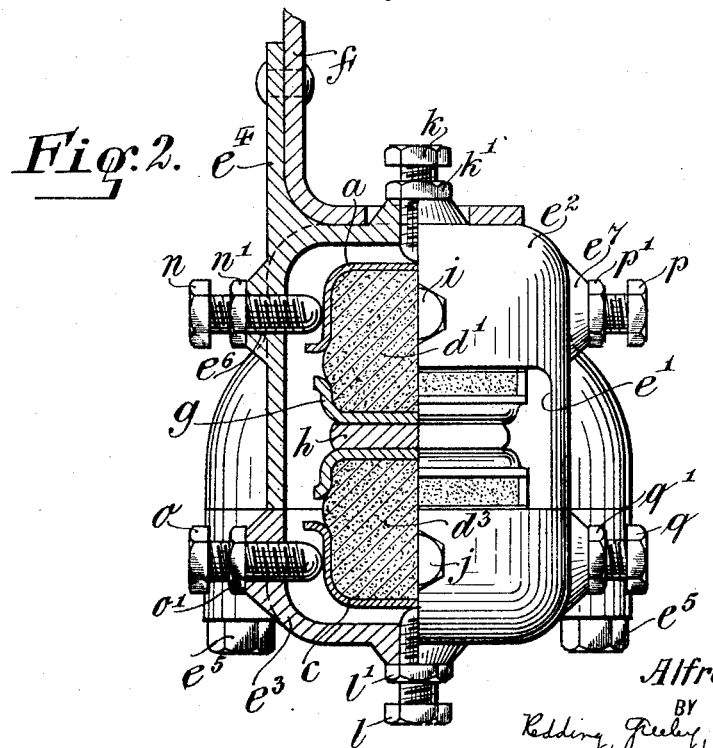
Figure 2 is a view in front elevation, and partly in section, showing the cushion connection according to Figure 1.

In the preferred embodiment according to the patent a block of yielding non-metallic material is illustrated as engaging the end of a vehicle leaf spring and is disposed within a housing carried with the chassis frame. In the drawings of the present invention independent seats $a$, $b$ and $c$ are illustrated as engaging the load, rebound and thrust sections $d'$, $d^2$ and $d^3$, respectively, of a block $d$ of yielding non-metallic material disposed within a housing $e$ carried with a vehicle frame member $f$ and engaging a seat member $g$ carried with the end of the leaf spring $h$ which enters housing $e$ through the aperture $e'$ formed in one wall of the housing. For convenience in assembly the housing is made in two parts, a main portion $e^2$ and a cap portion $e^3$, the main portion being preferably integral with a bracket portion $e^4$ by which the housing is secured to the frame and the two parts being removably secured together as by the bolts $e^5$.

The block $d$ is preferably formed of yielding nonmetallic material, such as rubber, and it is proposed to maintain this block under internal static pressure in order that its strength, resiliency and wearing qualities may be improved. It may also be found desirable to vary the degree of pressure to which the block is subjected dependent upon such factors as the quality of the non-metallic material going to make up the block or the load upon the vehicle. It may also be of advantage in some situations to definitely position the block within the housing without regard to the inner marginal surface of the housing. To this end it is proposed to provide devices capable of adjusting the yielding non-metallic material or the separate seats $a$, $b$ and $c$ therefore with respect to the walls of the housing to determine the position taken by the block. While various devices may be availed of to effect the positioning of the block, it is preferred to use a plurality of screws threaded into openings $e^6$ in the housing which passages $e^6$ for the screws are re-enforced by bosses $e^7$. Forwardly disposed screws $i$, $j$ bear upon the front face of the respective load and rebound sections. Similar screws $k$ and $l$ bear upon the top and bottom faces of the block. Rearwardly a single screw $m$ bears upon the thrust section $d^2$. To position the block with respect to the side walls of the housing screws $n$, $o$, $p$ and $q$ are provided. After the position of the block is determined the screws may be secured in adjusted position by means of the respective lock nuts $i'$, $j'$, $k'$, $l'$, etc. In the illustrated embodiment the screws are illustrated as bearing upon the seat members $a$, $b$ and $c$ but it will be obvious that other means to accomplish this result may be availed of in lieu of the seats.

It will thus be seen that the yielding non-metallic material may be definitely positioned within the housings by means of the screws illustrated and any desired degree of compression may be exerted upon the material by a predetermined projection of the screws.

Obviously various modifications may be made in the manner of distributing the effect of the screws over the surfaces of the non-metallic material other than the seats indicated and other forms of adjusting devices may be adopted without departing from the spirit and scope of the invention. The invention is furthermore not to be deemed limited to a connection and support between a vehicle spring and body but is equally applicable in any situation where one part is to be yieldingly supported from another by a cushioning connection.

What I claim is:

1. In a cushion connection between parts to be connected wherein a housing is carried with one of the parts and has an open side through which the other part enters the housing, yielding non-metallic material disposed within the housing and engaging the entering part, and a plurality of adjustable devices engaging the non-metallic material and means to adjust the position of the entire block with respect to the housing.

2. In a cushion connection between parts to be connected wherein a housing is carried with one of the parts and has an open side through which the other part enters the housing, yielding non-metallic material disposed within the housing and engaging the entering part, means to support the non-metallic material within the housing comprising a plurality of seats carried with the yielding non-metallic material, and a plurality of adjusting means carried by the housing and engaging the seats whereby the position of the non-metallic material may be bodily adjusted.

This specification signed this 23rd day of December, A. D. 1925.

ALFRED F. MASURY.